United States Patent
Hörnig

(10) Patent No.: US 7,372,017 B2
(45) Date of Patent: May 13, 2008

(54) METHOD FOR EQUALIZING A BUTTING STRUCTURE AND X-RAY SYSTEM

(75) Inventor: Mathias Hörnig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/473,410

(22) Filed: Jun. 23, 2006

(65) Prior Publication Data

US 2006/0291626 A1   Dec. 28, 2006

(30) Foreign Application Priority Data

Jun. 24, 2005   (DE)   ............... 10 2005 029 459

(51) Int. Cl.
*G01D 18/00*   (2006.01)
*G01J 1/24*    (2006.01)
*H05G 1/64*    (2006.01)

(52) U.S. Cl. ............... 250/252.1; 250/370.09; 378/98.9

(58) Field of Classification Search ........... 250/252.1, 250/370.09; 378/98.9, 19
See application file for complete search history.

(56) References Cited

U.S. PATENT DOCUMENTS 5,528,043 A    6/1996  Spivey et al.
6,854,885 B2   2/2005  Wischmann et al.
7,019,302 B2*  3/2006  Takabayashi et al. .. 250/370.11
2003/0169847 A1  9/2003  Karellas et al.
2004/0089813 A1*  5/2004  Takabayashi et al. .. 250/370.11
2004/0200971 A1* 10/2004  De Keyser ............. 250/370.09
2007/0007447 A1*  1/2007  Spahn .................... 250/252.1

FOREIGN PATENT DOCUMENTS

DE   101 35 427 A1   2/2003
DE   101 49 404 A1   4/2003
EP   1 467 226 A1   10/2004

* cited by examiner

*Primary Examiner*—David Porta
*Assistant Examiner*—Faye Boosalis

(57) ABSTRACT

A plurality of plates is bonded together by butting in order to manufacture a flat-plate x-ray detector. The butting determines artifacts in x-ray images taken with the flat-plate x-ray detector. According to the invention the butting structure is first measured in the flat-plate x-ray detector and a pixel quantity parameter is determined for an interpolation, whereby said parameter can be small for a narrow butting structure and large for a wide butting structure. Accordingly an interpolation of pixel data in x-ray images which have been taken is performed on the basis of the pixel quantity parameter, preferably by row or by column.

10 Claims, 1 Drawing Sheet

METHOD FOR EQUALIZING A BUTTING STRUCTURE AND X-RAY SYSTEM

CROSS REFERENCE TO RELATED APPLICATIONS

This application claims priority of German application No. 10 2005 029 459.6 filed Jun. 24, 2005, which is incorporated by reference herein in its entirety.

FIELD OF THE INVENTION

The invention relates to a method for equalizing a butting structure when taking flat-plate x-ray images. It also relates to an x-ray system. The invention further relates to a method for examining the quality of butting when manufacturing a flat-plate x-ray detector.

BACKGROUND OF THE INVENTION

Flat-plate x-ray detectors currently have useable surface areas of up to 43×43 cm$^2$. In order to manufacture these sizes it is necessary to manufacture the basic component, the plate, which consists for example of amorphous silicon, as a large surface. Since production machines are not designed for such sizes, in the prior art several plates are joined together and are bonded to one another on a substrate, for example a glass substrate. This bonding is also known as butting. A large-area flat-plate detector can for example consist of two or four individual plates. For example, the Pixium 4600 detector from Trixell consists of four individual plates made of amorphous silicon.

A problem entailed with butting is that the points where the individual plates are joined exhibit different sensitivity behavior and a variable diffusion of light, resulting in artifacts on the x-ray image. This is in particular also due to the cutting edges, which are never perfectly smooth. A hollow space between the plates is normally 20 μm to 60 μm wide and is ideally filled with adhesive. However, this ideal situation never pertains totally, rather there are air pockets and areas with excess adhesive. The plates can also be bonded on the substrate slightly canted from one another. The butting structures can extend over an area of 1.5 mm, which corresponds to ten pixels on each side of the plate. Thus it is clear that the butting structure can have a highly disruptive effect in an x-ray image.

Until now an average width of the butting structure has been assumed, and an interpolation of the pixels across this width is performed in the finished x-ray images. To a certain extent this interpolation is "fixed", i.e. regardless of whether the butting structure in a particular detector used is actually as big or bigger. Nor are variations in the width of the butting structure within the detector taken into account, rather the interpolation width for the whole image is the same.

It is known from U.S. Pat. No. 5,528,043 to make a correction in a flat-plate x-ray detector for gaps between different areas of the detector (which correspond to the butting structure), whereby an interpolation of six nearest neighbors is performed in the case of column or row defects. Here too the interpolation does not take into account whether the butting structure is actually as big or bigger in a particular detector being used.

From US patent application US 2003/0169847 A1 an x-ray system is known in which four CCDs are combined to form one x-ray detector. The resulting butting structure is identified using an algorithm by detecting pixel image values corresponding to the butting structure, and is corrected by means of interpolation.

From EP 1 467 226 A1 structures for an x-ray machine are known in which individual sections of the image overlap. Thus this does not involve conventional butting. In the overlap area interpolations can be used for smoothing the image.

From DE 101 35 427 A1 it is known to infer the butting structure in a flat-plate x-ray detector indirectly by recording a sudden local grayscale change. Corresponding corrections are made in the grayscale values.

SUMMARY OF THE INVENTION

The object of the invention is to provide a more flexible method for equalizing a butting structure when taking images with a flat-plate x-ray detector.

The object is achieved by a method according to the claims.

Accordingly the butting structure on the flat-plate x-ray detector is first measured and a pixel quantity parameter individual to the flat-plate x-ray detector is determined for an interpolation; only then is an interpolation of pixel data values performed in an image (every image or a minimum of one) taken by the relevant flat-plate x-ray detector, on the basis of the pixel quantity parameter.

Thus according to the invention a fixed standard butting structure is not assumed, but the pixel quantity parameter for the interpolation can be flexibly determined by means of measuring as a function of the actual butting structure. The method thus makes it possible to look at the actual butting structure flexibly and if it is good to use only a small number of pixels for interpolation and if it is poor to use a somewhat higher number of pixels.

In a preferred embodiment this flexibility is increased further in that the pixel quantity parameter is determined as a function of rows or columns, the interpolation then taking place in the different rows or columns of the image on the basis of the pixel quantity parameter as a function of rows or columns.

Thus the number of pixels across which the interpolation should extend can be determined afresh each time row by row (or column by column), so that in the case of a flat-plate x-ray detector in which the butting structure is very narrow at one point and is wider at another point, an interpolation can be performed across just a few pixels in some areas of the image, and in another area of the image, where necessary, an interpolation can take place across a greater number of pixels.

In a preferred embodiment the butting structure is measured on the basis of at least one image recorded on the flat-plate x-ray detector by means of backlight (backlight recording). A backlight board is normally provided for this purpose, in other words an LED board covering the size of the detector underneath the plate and the glass substrate, onto which the plates are bonded. While a scintillator converts x-ray light into visible light on the front of the flat-plate x-ray detector, visible light can be directly coupled in from the rear and used to generate signals for recording an image.

Such a backlight recording is preprocessed for measuring the image structure (for example by performing an offset correction and/or lowpass filtering), and the resulting backlight recording normally shows the butting structure such that the boundaries of the butting structure can be determined using a threshold value criterion concerning the signal height, so that the width of the butting structure can also automatically be determined by a data processing unit and the pixel quantity parameter can be determined.

Conventional backlight boards enable different light intensities to be emitted. In a preferred embodiment of the invention, a plurality of backlight recordings are taken at different backlight intensities and are assigned to an x-ray light dose such that the pixel quantity parameter is determined as a function of the x-ray light dose. By means of the backlight an emission of light is simulated by the scintillator on the basis of an x-ray dose. Hence a different light intensity corresponds to the simulation of a different x-ray dose. Accordingly the pixel parameters determined as a function of the x-ray light dose enable an interpolation to be performed for an (actual, real) x-ray image on the basis of the x-ray light dose used for recording the image.

A plurality of backlight recordings for different mode settings of the flat-plate x-ray detector can also be taken, and the pixel quantity parameter can be set accordingly as a function of the mode. Accordingly an interpolation can then be performed in an x-ray image on the basis of the flat-plate x-ray detector mode used when recording the image.

The invention also relates to an X-ray system. An X-ray system comprises an x-ray emitter, a flat-plate x-ray detector and a data processing unit. In the prior art, as mentioned above, the data processing unit is designed so that interpolations are performed in an x-ray image taken by the flat-plate x-ray detector. As already mentioned, the inventive method enables the pixel quantity parameter to be determined as a function of rows or columns. Accordingly, in the invention the data processing unit is designed (programmed) so that the interpolation is performed across a variable number of pixels as a function of rows or columns.

The idea of measuring the butting structure by means of backlight recordings can also be realized when manufacturing a flat-plate x-ray detector. The invention hence provides a method for examining the quality of butting when manufacturing a flat-plate x-ray detector, in which the detector is made ready for taking backlight recordings prior to the step of linking a scintillator to a detector consisting of various plates connected by butting. In other words, the backlight board is already fitted without the scintillator first being linked. The butting structures can then be measured on the basis of backlight recordings, since the plates as such already enable an image to be taken regardless of a scintillator being linked, if they are simply irradiated with light. The inventive method enables the butting structure to be mapped and examined during manufacture, so that firstly the parameters for the interpolation can already be determined and secondly if these are too poor corrections can if necessary still be made to the butting structure or the flat-plate x-ray detector can even be rejected.

BRIEF DESCRIPTION OF THE DRAWINGS

A preferred embodiment of the invention is now described with reference to the drawings, in which.

DETAILED DESCRIPTION OF THE INVENTION

Figure 1:
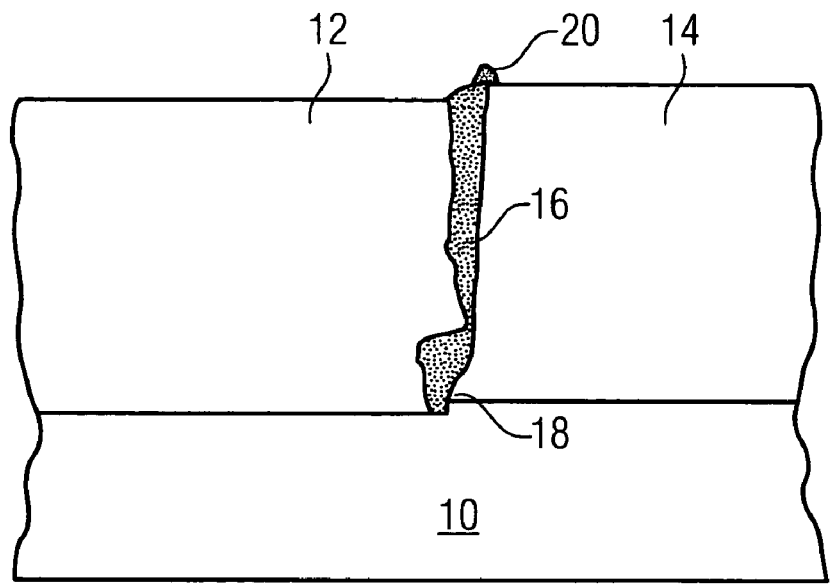
FIG. 1 is a schematic representation of a butting point.

In the case of the inventive butting point, two plates 12 and 14 made of amorphous silicon are bonded to a glass substrate 10 not shown to scale here in terms of its thickness. The plates 12 and 14 are bonded to one another here by means of an adhesive 16. The plates 12 and 14 are shown canted here, whereby a canting 18 in the lower portion results in the plate 14 standing proud of the plate 12 at the surface. A excess drop of adhesive 20 is located partially on the plate 14.

A butting structure such as that shown in FIG. 1 results in artifacts in x-ray images taken using such a flat-plate x-ray detector.

To correct such x-ray images, interpolation across the width of the butting structure should be performed. For this, it is first necessary to measure the width of the butting structure.

This involves taking a recording using a backlight board rather than an x-ray recording, said backlight board being located underneath the glass substrate 10 (not shown in FIG. 1). The glass substrate 10 allows the backlight to penetrate to the plates 12 and 14, which generate an image signal regardless of from which direction the light is coming, i.e. whether it leaves a scintillator fixed to the plates 12 and 14 or comes from the opposite side as backlight.

Figure 2:
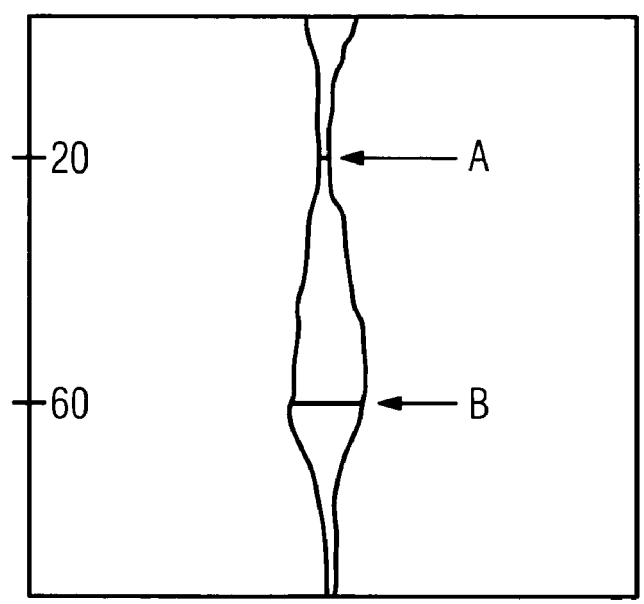
FIG. 2 is a schematic representation of a preprocessed backlight recording in which the butting structure can be detected.

Accordingly the detector with the butting structure according to FIG. 1 can take an image with the backlight. To improve the signal/noise ratio averaging using several images can take place. The darkframe portions and fixed pattern structures are removed from the backlight images using image subtraction (offset correction). Moreover, lowpass filtering can be performed to homogenize the images. Since the borders of the butting structure are borders at which the signal height changes, an image of the type shown in FIG. 2 is produced. Note that here in contrast to FIG. 1 the top view of plates 12 and 14 is shown. The butting structure that can be seen extends vertically to the row count, with its width varying considerably across the rows. In row 20 the butting structure for example narrows at point A, while in row 60 it widens at point B. Essentially the butting structure made visible here by backlight recording is also reflected in artifacts in x-ray images. Hence equalization needs to be performed in x-ray images. The signals in the area of the butting structure should be determined by the signals in the vicinity, because otherwise they are unusable. Hence an interpolation of the signals is performed across the width of the butting structure.

Whereas in the prior art an interpolation is performed across a previously ascertained width without taking account of details of the actual flat-plate x-ray detector, here the interpolation should be customized to the flat-plate x-ray detector with the measured butting structure to prevent interpolation artifacts. Thus for example at point A the interpolation need only be performed across a width of 3 to 5 pixels, whereas at point B it has to be performed across a width of perhaps 10 to 12 pixels. Hence in the inventive method the pixel quantity parameter is determined as a function of the row number. Since the butting structure in the preprocessed backlight image, as can be seen in FIG. 2, can be detected as a contour, a threshold value criterion concerning the signal height in the image is sufficient to automatically determine the width of the structure. A data processing unit can hence automatically determine the pixel quantity parameter for interpolation as a function of rows from the backlight recording and save it in a table. The parameters can be saved as a function of the detector mode set and also as a function of the backlight intensity to be set in respect of an x-ray light dose. Since the detector is permanently assigned to the pixels of the images which it has taken, it is sufficient to determine and save the pixel quantity parameters for the various rows once and for all.

Then at any time in the future, a corresponding interpolation can be performed each time an x-ray image is taken.

The invention is not restricted to the partial determination of the pixel quantity parameter illustrated here. The plates can also be bonded orthogonally to the direction shown, so that interpolation by columns using pixel quantity parameters defined by columns is then necessary. Four plates can also be bonded to one another, producing a cruciform structure as a butting structure and where interpolation by row as well as by column is necessary for the x-ray image, so that the pixel quantity parameters have to be determined both by row and by column.

In the case of the invention, for the first time an equalization of the butting structure is performed as a function of the detector, i.e. as a function of the actual butting structure.

The invention claimed is:

1. A method for equalizing butting structures on a flat-plate x-ray detector when taking an x-ray image with the flat-plate x-ray detector, the detector being of the type wherein several plates are joined together and bonded to one another on a substrate in a pattern of rows or columns about which butting structures of variable width are formed comprising:
   measuring the width along a butting structure at the flat-plate x-ray detector;
   determining values of a pixel quantity parameter of the butting structure at the flat-plate x-ray detector for an interpolation of a pixel data value wherein the values of the pixel quantity parameter are determined as a function butting structure width measured along a row or column; and
   performing the interpolation of the pixel data value in the x-ray image taken with the flat-plate x-ray detector wherein the number of pixels used in the interpolation is a function of the pixel quantity parameter.

2. The method as claimed in claim 1, wherein the pixel quantity parameter is determined as a function of a row or a column of the x-ray image and the interpolation is performed as a function of the row or the column based on the pixel quantity parameter.

3. The method as claimed in claim 1, wherein the butting structure width is measured using a backlight recording based on the x-ray image recorded on the flat-plate x-ray detector.

4. The method as claimed in claim 3, wherein the backlight recording is preprocessed and is subjected to a threshold value criterion to determine the pixel quantity parameter.

5. The method as claimed in claim 4, wherein the preprocessing includes an offset correction.

6. The method as claimed in claim 4, wherein the preprocessing includes an lowpass filtering.

7. The method as claimed in claim 3,
   wherein a plurality of backlight recordings are taken at a plurality of different backlight intensities which are assigned to a plurality of different x-ray light doses,
   wherein the pixel quantity parameter is determined as a function of the x-ray light doses and the interpolation is performed in the x-ray image based on a selected x-ray light dose used for taking the x-ray image.

8. The method as claimed in claim 3,
   wherein a plurality of backlight recordings are taken for a plurality of different mode settings of the flat-plate x-ray detector,
   wherein the pixel quantity parameter is determined as a function of the mode settings and the interpolation is performed in the x-ray image based on a selected mode setting of the flat-plate x-ray detector when taking the x-ray image.

9. A method for examining a quality of a butting structure on a flat-plate x-ray detector when manufacturing the flat-plate x-ray detector, comprising:
   butting a plurality of plates to the flat-plate x-ray detector, the resulting structure characterized by a variable butting structure width;
   making the flat-plate x-ray detector ready for taking a backlight recording of the flat-plate x-ray detector prior to link a scintillator to the flat-plate x-ray detector;
   measuring the butting structure width as a function of position along the plates based on the backlight recording; and
   examining the quality of the butting structure on the flat-plate x-ray detector.

10. An x-ray system, comprising:
    an x-ray emitter;
    a flat-plate x-ray detector consisting of a plurality of plates connected to one another by one or more butting structures; and
    a data processing unit for performing an interpolation in an x-ray image taken by the flat-plate x-ray detector,
    wherein values of a pixel quantity parameter of one butting structure at the flat-plate x-ray detector are determined as a function of change measured along the one butting structure and the number of pixels whose values are used to perform the interpolation is based on the determined values of the pixel quantity parameter.

* * * * *